United States Patent

[11] 3,600,723

[72] Inventors Paul A. Mongerson
 Elyria;
 Alfred M. Moen, Grafton; Charles G. Mackie, Elyria, all of, Ohio
[21] Appl. No. 850,977
[22] Filed Aug. 18, 1969
[45] Patented Aug. 24, 1971
[73] Assignee Stanadyne, Inc.
 Hartford, Conn.

[54] FAUCET-MOUNTING CONSTRUCTION
 12 Claims, 4 Drawing Figs.
[52] U.S. Cl. ................................................. 4/192
[51] Int. Cl. ................................................. E03c 1/04
[50] Field of Search ......................................... 4/191, 192

[56] References Cited
UNITED STATES PATENTS

| | | | |
|---|---|---|---|
| 2,255,125 | 9/1941 | Mullett | 299/144 |
| 2,262,290 | 11/1941 | Kuhnle | 4/192 |
| 2,392,918 | 1/1946 | Haberstump | 137/111 |
| 2,538,835 | 1/1951 | Harvey et al. | 285/96.3 |
| 2,675,017 | 4/1954 | Fredrickson et al. | 137/356 |
| 2,743,461 | 5/1956 | Urbas | 4/191 |
| 3,010,474 | 11/1961 | Moen | 137/359 |
| 3,012,251 | 12/1961 | Fife | 4/192 |
| 3,495,616 | 2/1970 | Esposito | 137/356 |

FOREIGN PATENTS

| | | | |
|---|---|---|---|
| 953,019 | 5/1949 | France | 4/192 |
| 411,729 | 11/1966 | Switzerland | 4/192 |

Primary Examiner—Laverne D. Geiger
Assistant Examiner—Donald B. Massenberg
Attorney—Parker, Carter & Markey ABSTRACT: Means for mounting a mixing faucet having a mixing valve in which the mixing valve is supported on a bracket attached to a sink top at its lower end. An escutcheon surrounds the mixing valve and is seated at its lower end upon the sink top. The upper portion of the escutcheon is attached to an upper portion of the mixing valve by a threaded nut, with the nut providing a downwardly directed force upon the top of the escutcheon to hold it to the sink top. There are seals at the upper and lower ends of the escutcheon so that the entire interior of the escutcheon is watertight.

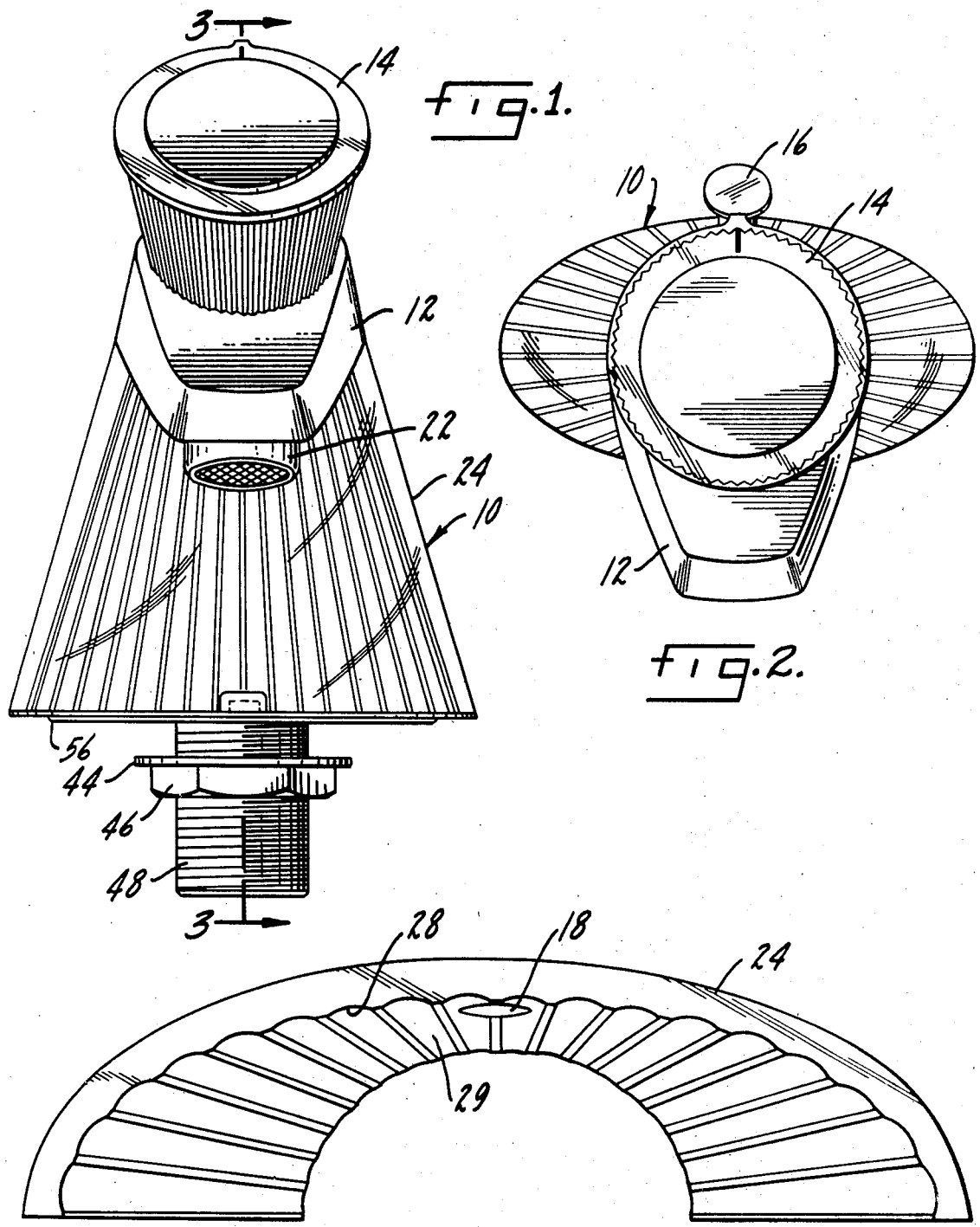

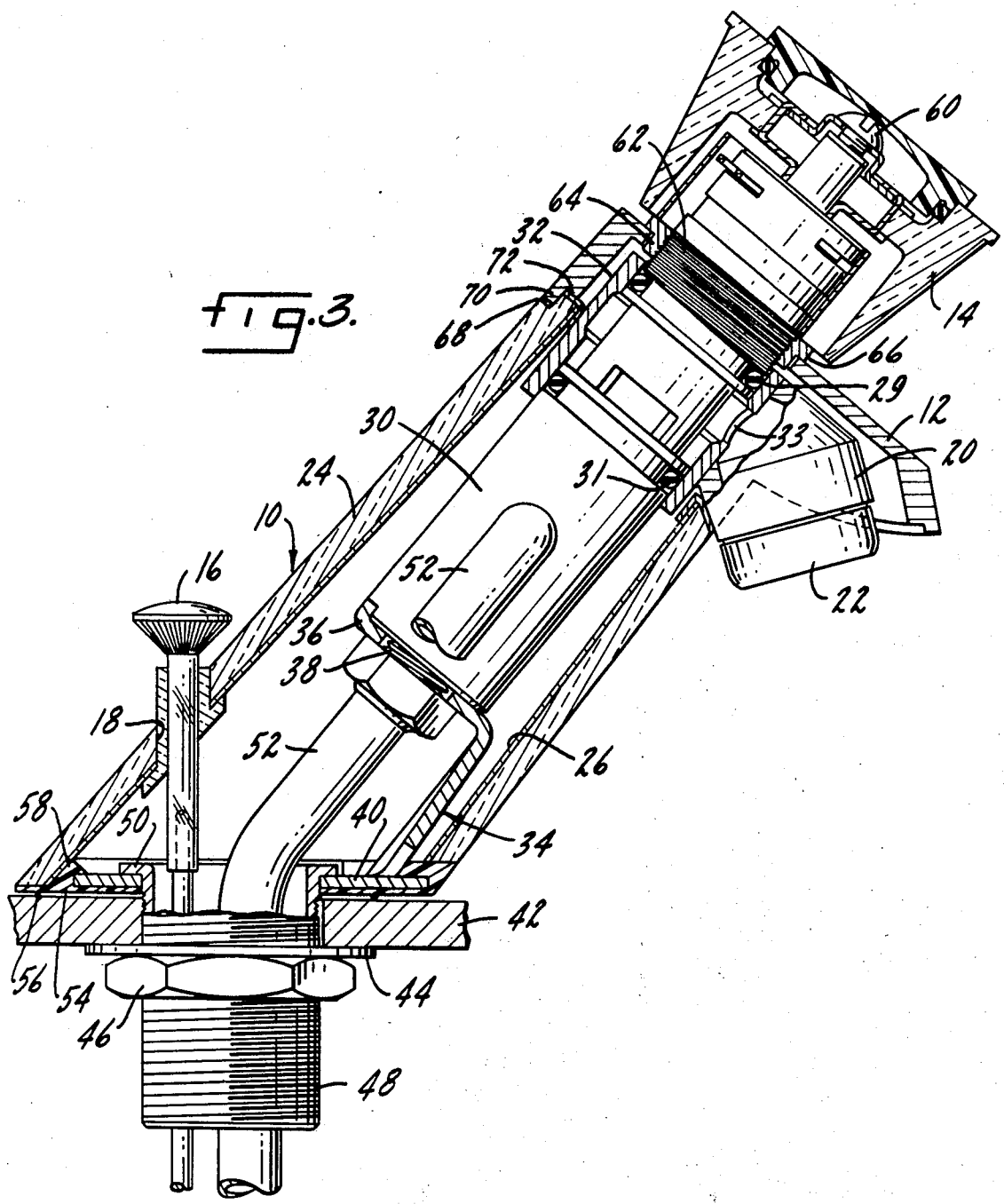

FAUCET-MOUNTING CONSTRUCTION

SUMMARY OF THE INVENTION

The present invention relates to improvements in a mixing valve mounting construction and has particular relation to a means for supporting a mixing valve within an escutcheon.

Another purpose of the invention is a faucet-mounting construction providing watertight seals at the upper and lower ends of a decorative escutcheon.

Another purpose is a bracket construction for mounting a mixing valve within an escutcheon.

Another purpose is a faucet construction of the type described in which the escutcheon includes an outer transparent sleeve and an inner decorative sleeve which is interchangeable.

Other purposes will appear in the ensuing specification, drawings and claims.

BRIEF DESCRIPTION OF THE DRAWINGS

The invention is illustrated diagrammatically in the following drawings wherein:

FIG. 1 is a front view of a faucet of the type described,

FIG. 2 is a top view taken from a plane parallel to the top of the faucet control knob, FIG. 3 is a section along plane 3—3 of FIG. 1, and FIG 4 is a partial bottom view of one-half of the escutcheon.

DESCRIPTION OF THE PREFERRED EMBODIMENT

A faucet escutcheon is indicated at 10 and is generally conical in configuration. A spout cover 12 overlies the top of the escutcheon and a control knob 14 is positioned at the upper end of the entire assembly. A drain control knob 16 extends through an opening 18 at the rear of the escutcheon as is conventional in bathroom basin or lavatory faucets. A spout 20 is positioned below the spout cover 12 and may have a conventional aerator 22.

Turning particularly to FIG. 3, the escutcheon 10 has an outer sleeve 24 and an inner sleeve 26. The inside surface 28 of the outer sleeve 24 may have a series of spaced grooves 29 to create a decorative design. Preferably the outer sleeve 24 is transparent although in some configurations it may be opaque or colored. The inner sleeve 26, which is interchangeable or removable, may have a decorative exterior such that the combination of the decorative inner sleeve 26 and the decorative inside surface of the outer sleeve 24 provides the over all aesthetic design illustrated particularly in FIGS. 1 and 2. In like manner, the control knob 14 may have a similar decorative design.

Positioned within the escutcheon 10 is a cartridge receiver 30 which is in the form of a sleeve for holding a mixing valve or faucet cartridge of the type shown in Pat. Re. 25,920. The invention should not be limited to this particular mixing valve, as obviously other valves are practical. The cartridge receiver 30 may include a discharge sleeve 32 having a port 33 in alignment with the spout 20. The spout 20 may be brazed or otherwise attached to sleeve 32. Seals 29 and 31 are positioned on opposite sides of the discharge area.

The lower end of the cartridge receiver 30 is seated upon a bracket indicated generally at 34, having an upper portion 36, which is fastened by means of a stud or the like 38 to the cartridge receiver 30. The lower end of the bracket 34 may be oval in shape and is indicated at 40 and is sealed upon a sink top 42. The lower oval section 40 of the bracket 34 may be held to the sink top 42 by means of a washer 44 and a nut 46 which is threadedly engaged with a sleeve 48 having an upper outwardly extending flange 50 which overlies the upper side of the bracket portion 40. As is conventional, there is an opening in the sink and the sleeve 48 and nut 46 hold the bracket 34 to the top of the sink. The hot and cold water inlet pipes, indicated at 52 in FIG. 3, pass upwardly through the opening in the oval bracket portion 40 and through the sleeve 48 for attachment to opposite sides of the cartridge receiver 30 and thus to opposite sides of the mixing valve within the cartridge receiver.

A seal 54 has a lower annular ridge 56 which seats upon the sink top. A upper portion 58 of the seal 54 is positioned adjacent the inner surface of the escutcheon 10 and surrounds the outside of the oval bracket portion 40. Thus, there is a complete seal at the bottom of the escutcheon so that no water can leak from inside of the escutcheon outwardly upon the sink.

At the upper end of the cartridge receiver 30 the knob 14 may be attached to the mixing valve by means of a screw or the like 60. A portion of the cartridge receiver is threaded, as at 62. A nut 64 is engaged with the threaded portion 62 and has an outwardly extending flange 66 which bears downwardly upon the top of the spout cover 12. At the top of the escutcheon 10 the outer sleeve 24 has a groove 68 and there is a flange 70 at the lower end of the spout cover 12 which fits within the groove 68 to form a mating connection between the spout cover and the escutcheon. A seal 72 is positioned between the spout cover, the escutcheon and the exterior of the discharge sleeve 32. Thus, the upper end of the escutcheon is watertight, as is the lower end. The seal 72 extends annularly about the top of the escutcheon and has a portion positioned between the top of the escutcheon and the lower end of the spout cover 12.

Of particular importance is the bracket for supporting the cartridge receiver. In prior faucet constructions, the valve was attached to the escutcheon and the escutcheon was then attached to the lavatory bowl. However, in the present instance the cartridge receiver and mixing valve are attached to a special bracket which is in turn attached to the lavatory bowl or the sink top. Then the escutcheon is placed on top of the valve after which the nut 64 is added to secure the escutcheon to the valve.

Although the term "cartridge receiver" has been used to describe a member separate from the mixing valve, in some applications the mixing valve itself may be directly supported.

Also of importance is the sleeve construction, including a transparent outer sleeve and a removable decorative inner sleeve. By having the inner sleeve removable, it is possible to match the decor of the bathroom with that of the faucet.

Whereas the preferred form of the invention has been shown and described herein, it should be realized that there are many modifications, substitutions and alterations thereto within the scope of the following claims.

We claim:

1. Means for mounting a mixing faucet having a mixing valve to a sink top, including an outer faucet escutcheon seated on the sink top, bracket means positioned within the escutcheon and supporting the mixing valve, means for attaching the lower end of the bracket to the sink top, a spout cover positioned on top of the escutcheon, and means, removably attached to an upper portion of the mixing valve and having a portion overlying the spout cover for providing a downwardly directed force on the spout cover and escutcheon to hold the escutcheon upon the sink top.

2. The structure of claim 1 further characterized by and including seal means between the sink top, lower end of the escutcheon and said bracket means.

3. The structure of claim 1 further characterized by and including a seal between an upper portion of said escutcheon and an upper portion of said mixing valve.

4. The structure of claim 1 further characterized in that said bracket means includes a bracket member having an upper portion supporting the lower end of the mixing valve and attached thereto and a lower portion seated upon the sink top within the escutcheon.

5. The structure of claim 1 further characterized in that the means removably attached to an upper portion of the mixing valve includes a nut, threadedly engaged with the mixing valve and having an outwardly directed flange bearing downwardly upon the spout cover.

6. The structure of claim 1 further characterized in that said escutcheon includes inner and outer sleeves.

7. The structure of claim 6 further characterized in that said outer sleeve is transparent.

8. The structure of claim 6 further characterized in that said inner sleeve is interchangeable.

9. The structure of claim 1 further characterized in that the inner surface of said escutcheon outer sleeve is formed by a series of decorative grooves.

10. Means for mounting a mixing faucet having a mixing valve to a sink top including an outer generally conical faucet escutcheon seated on the sink top, a bracket positioned within the escutcheon and having an upper portion supporting the mixing valve, a lower portion of said bracket being seated upon the sink top, means for attaching the lower portion of the bracket to the sink top, a spout cover positioned on top of the escutcheon, a nut threadedly engaged with an upper portion of said mixing valve and having an outwardly extending flange overlying the upper end of the spout cover, such that the nut provides a downwardly directed force upon the spout cover and escutcheon to hold the escutcheon onto the sink top, and seal means at the upper and lower ends of the escutcheon for sealing off the interior thereof.

11. The structure of claim 10 further characterized in that said seal means includes a lower seal in contact with the escutcheon, sink top, and lower portion of the brackets, and an seal positioned between the spout cover and the escutcheon and the mixing valve.

12. Means for mounting a mixing faucet having a mixing valve to a sink top, including an outer faucet escutcheon seated in the sink top, bracket means positioned within the escutcheon and supporting the mixing valve, means for attaching the lower end of the bracket to the sink top, and a nut removably attached to an upper portion of the mixing valve and having a portion overlying the escutcheon for providing a downwardly directed force on the escutcheon to hold it upon the sink top.